United States Patent [19]
Yanagita et al.

[11] Patent Number: 5,889,283
[45] Date of Patent: Mar. 30, 1999

[54] RADIOGRAPHIC INTENSIFYING SCREEN AND RADIOGRAPHIC IMAGE CONVERTING PANEL

[75] Inventors: Takafumi Yanagita; Kouji Amitani, both of Hino, Japan

[73] Assignee: Konica Corporation, Tokyo, Japan

[21] Appl. No.: 804,739

[22] Filed: Feb. 21, 1997

[30] Foreign Application Priority Data

Mar. 1, 1996 [JP] Japan .................................. 8-044694

[51] Int. Cl.$^6$ .................................................. C09K 11/06
[52] U.S. Cl. .................................. 250/484.2; 252/301.36
[58] Field of Search .............................. 250/484.2, 484.4, 250/581; 252/301.36; 428/691

[56] References Cited

U.S. PATENT DOCUMENTS 4,415,471  11/1983  Degenhardt ..................... 252/301.36
5,164,224  11/1992  Kojima et al. ..................... 250/483.1

*Primary Examiner*—Edward P. Westin
*Assistant Examiner*—Richard Hanig
*Attorney, Agent, or Firm*—Frishauf, Holtz, Goodman, Langer & Chick, P.C.

[57] ABSTRACT

A radiographic intensifying screen and a radiographic image converting panel comprising a support having thereon a fluorescent substance layer containing fluorescent substance particles dispersed in a binder, wherein said binder comprises a resin containing a hydrophilic polar group.

10 Claims, No Drawings

5,889,283

RADIOGRAPHIC INTENSIFYING SCREEN AND RADIOGRAPHIC IMAGE CONVERTING PANEL

FIELD OF THE INVENTION

The present invention relates to a radiographic intensifying screen and radiographic image converting panel, both having high image quality with respect to sharpness and graininess.

BACKGROUND OF THE INVENTION

Cited as a means for obtaining a radiographic image for medical diagnosis or non-destructive testing of a various types of tissues and applying it to diagnosis and radiographic flaw detection are: radiography by a combination of a silver halide photographic light sensitive material and a radiographic intensifying screen, or radiographic image conversion method by the use of a fluorescent substance from which, after absorption of radiation energy, the accumulated radiation energy is emitted in the form of fluorescence by stimulation with electromagnetic waves such as visible light or infra-red rays (hereinafter referred to as photo-stimulative fluorescent substance).

Diagnosis or examination with radiography is such that radiation transmitted through or emitted from photographic object is converted, through absorption by fluorescent substance contained in the radiographic intensifying screen and its excitation, into visible light, which produces a radiographic image on the silver halide photographic light sensitive material. The radiographic image is formed by exposing, to radiation through an object, the silver halide photographic light sensitive material having on one side or both sides of a support a silver halide emulsion layer, which is in contact with a radiographic intensifying screen to a radiation through an object.

The fluorescent substance has a high emission luminance and can form a radiographic image with a relatively small dose of radiation, so that exposure to radiation of the object can be minimized. It is well known that sharpness and graininess of the image depend upon the particle size and dispersion of the fluorescent substance, and homogeneity in a fluorescent substance containing layer.

The radiographic image conversion method employing the photo-stimulative fluorescent substance includes the employment of a radiographic image converting panel containing the photo-stimulative fluorescent substance (hereinafter, referred to as photo-stimulative fluorescent substance panel). In this case, the radiation transmitted through or emitted from the object is absorbed by a fluorescent substance contained in the panel, followed by stimulating time-sequentially the fluorescent substance with electromagnetic waves such as visible light and infra-red rays (also known as stimulating light), and emitting the radiation energy accumulated in the fluorescent substance, in the form of light (photo-stimulated luminescence). The photo-stimulated luminescence is read as electric signals and based the electric signals obtained, the object or its radiographic image is reproduced as a visible image. The panel which has already been read is treated to eliminate residual images and made ready for the next photograph. Thus, the conversion panel can be repeatedly employed.

The radiographic image converting panel is also dependent upon the particle size and dispersibility of the fluorescent substance, and homogeneity in the fluorescent substance containing layer.

It has been regarded that since the fluorescent substance size is as large as 1 to 30 μm of particles and is readily dispersible, the fluorescent substance can be dispersed in any resin to some extent. Accordingly, few studies thereof have been made as to the resins for use in dispersing the fluorescent substance,. For example, a technique for improving the dispersibility by using a mixture of three kinds of resins is disclosed in JP-A 61-277098 (herein the expression, "JP-A" means unexamined and published Japanese Patent Application. However, it was proved that this technique did not contribute to enhancement of dispersing capability of the resin with respect to the fluorescent substance and had little effect in homogeneous dispersion.

Inventors of the present invention have made studies of dispersibility of the fluorescent substance. As a result, it was found that sharpness and graininess were markedly improved by enhancement of dispersing capability of the resin for the fluorescent substance.

SUMMARY OF THE INVENTION

Accordingly, an object of the present invention is to provide a radiographic intensifying screen or radiographic image converting panel excellent in sharpness and graininess, through enhancement of dispersing capability of the resin for the fluorescent substance.

The above object can be accomplished by the following:

1. A radiographic intensifying screen comprising a support having thereon a fluorescent substance layer containing fluorescent substance particles dispersed in a binder, characterized in that said binder comprises a resin containing a hydrophilic polar group.

2. The radiographic intensifying screen described in 1, characterized in that said resin contains the hydrophilic polar group selected from the group consisting of -, $-OSO_3M$, $-COOM$, $-PO(OM)_2$ and $-OPO(OM)_2$, in which M is a hydrogen atom or an alkali metal atom, such as Li, K and Na. $SO_3M$ 3. The radiographic intensifying screen described in 1 and 2, characterized in that the content of said hydrophilic polar group used in the fluorescent substance layer is 0.01 to 100 mg per g of the binder 4. The radiographic intensifying screen described in 1, 2 and 3, characterized in that said resin containing the hydrophilic polar group is a resin selected from the group consisting of polyurethanes, polyesters, polyvinyl chlorides, polyvinyl butyrals and nitrocelluloses.

5. A radiographic image converting panel comprising a support having thereon a photo-stimulative fluorescent substance layer containing photo-stimulative fluorescent particles dispersed in a binder, characterized in that said binder comprises a resin containing a hydrophilic polar group.

6. The radiographic image converting panel described in 5, characterized in that said resin contains the hydrophilic polar group selected from the group consisting of $-SO_3M$, $-OSO_3M$, $-COOM$, $-PO(OM)_2$ and $-OPO(OM)_2$, in which M is a hydrogen atom or an alkali metal atom, such as Li, K and Na.

7. The radiographic image converting panel described in 5 and 6, characterized in that the content of said hydrophilic polar group used in the fluorescent substance layer is 0.01 to 100 mg per g of the binder 8. The radiographic image converting panel described in 5, 6 and 7, characterized in that said resin containing the hydrophilic polar group is a resin selected from the group consisting of polyurethanes, polyesters, polyvinyl chlorides, polyvinyl butyrals and nitrocelluloses.

DETAILED DESCRIPTION OF THE INVENTION

The resin containing a hydrophilic polar group according to the invention is one containing a hydrophilic polar group selected from the group consisting of —SO$_3$M, —OSO$_3$M, —COOM, —PO(OM')$_2$, and —OPO(OM')$_2$ (i.e., negative functional group), in which M is hydrogen atom or an alkali metal atom such as Li, K, Na. In this case, the hydrophilic polar group improves dispersion of the fluorescent substance particles, through its adsorption to the surface of the particles, leading to prevention of coagulation of the fluorescent substance particles and enhancement of coating stability, sharpness and graininess.

As a preferred example of the resin containing the hydrophilic polar group, polyurethane is explained further in detail. Polyurethane can be synthesized through reaction of a polyol with a polyisocyanate which is generally employed. As a polyol component is generally used polyesterpolyol which can be obtained through reaction of the polyol with a polybasic acid. According to this known method, the polyesterpolyol containing the hydrophilic polar group can be synthesized by using the polybasic acid containing the hydrophilic polar group, as a part of the polybasic acid.

Examples of the polybasic acid include phthalic acid, isophthalic acid, terephthalic acid, adipic acid, azelaic acid, cebacic acid and maleic acid. Examples of the polyesterpolyol containing the hydrophilic polar group include, 5-sulfoisophthalic acid, 2-sulfoisophthalic acid, 4-sulfoisophthalic acid, 3-sulfoisophthalic acid, dialkyl 5-sulfoisophthalate, dialkyl 2-sulfoisophthalate, dialkyl 4-sulfoisophthalate, dialkyl 3-sulfoisophthalate and their sodium or potassium salt.

Examples of the polyol include trimethylol propane, hexanetriol, glycerin, trimethylolethane, neo-pentylglycol, pentaerythritol, ethylene glycol, propylene glycol, 1,3-butanediol, 1,4-butanediol, 1,6-hexanediol, diethylene glycol and cyclohexanedimethanol.

Polyesterpolyols containing other hydrophilic polar groups can also be synthesized by a conventionally known method. The polyurethane can be prepared by using these polyesterpolyol as a raw material for the synthesis.

Examples of the polyisocyanate include diphenylmethan-4,4-diisocyanate (MDI), hexamethylene diisocyanate (HMDI), tolylene diisocyanate (TDI), 1,5-naphthalene diisocyanate (NDI), toluidine diisocyanate (TODI), lysine isocyanate methyl ester (LDI) and isopolodiisocyanate (IPDI).

As another method for synthesizing the polyurethane, it can be prepared through addition reaction of the following compound containing the hydrophilic polar group and a chlorine atom to a polyurethane containing a OH group.

ClCH$_2$CH$_2$SO$_3$M

ClCH$_2$CH$_2$OSO$_3$M

ClCH$_2$PO(OM')$_2$

ClCH$_2$COOM

Furthermore, there are also commercially available polyurethane containing —SO$_3$Na group, UR8300 )product by Toyobo Co. Ltd.) and polyurethane containing —COOH group. TIM-6001 (product by Sanyo Kasei Co. ltd.).

In addition to the resins above-described, the following resins are usable as a binder containing the hydrophilic polar group. Examples thereof are one having a weight-averaged molecular weight of 5,000 to 200,000, including a vinyl chloride copolymer, vinyl chloride-vinyl acetate copolymer, vinyl chloride-vinylidene chloride copolymer, butadiene-acrylonitrile copolymer, polyamide, poly(vinyl butylal), cellulose derivative (e.g., nitrocellulose), styrene-butadiene copolymer, a variety of synthetic rubber type resins, phenol resin, epoxy resin, urea resin, melamine resin, pheoxy resin, silicone resin, acryl type resin, urea-formamide resin. Among these are preferred a polyester, vinyl chloride type copolymer poly(vinyl butyral) and nitrocellulose.

The vinyl chloride type resin can be synthesized through addition reaction of the following compound containing a hydrophilic polar group and a chlorine atom to a copolymer containing a OH group such as vinyl chloride-vinyl alcohol copolymer.

ClCH$_2$CH$_2$SO$_3$M

ClCH$_2$CH$_2$OSO$_3$M

ClCH$_2$PO(OM')$_2$

ClCH$_2$COOM

In the case of ClCH$_2$CH$_2$SO$_3$M, for example, it can be synthesized as follows:

—[CH$_2$C(OH)H]—+ClCH$_2$CH$_2$SO$_3$M→—[CH$_2$C(H)—O—(CH$_2$)$_2$SO$_3$Na]—+HCl

Alternatively, copolymerization can be done by using copolymerizable monomers. Thus, a reactive unsaturated monomer having a repeating unit with a hydrophilic polar group is introduced into a reaction vessel such as an autoclave with a given volume and polymerization can be done by using a conventional polymerization initiator including radical polymerization initiator such as benzoyl peroxide (BPO) and azobisisobutyronitrile (AIBN), redox polymerization initiator, anionic polymerization initiator and cationic polymerization initiator. Examples of the reactive monomer for introducing a sulfonic acid or its salt include unsaturated hydrocarbon sulfonic acids such as vinyl sulfonic acid, acrylsulfonic acid and p-styrenesulfonic acid and its salts. Furthermore, acryl or methacrylsulfoalkyl ester such as 2-acrylamido-2-methylpropanesulfonic acid, (metha)acrylsulfonic acid ethyl ester, (metha)acrylsulfonic acid propyl ester and their salts and ethyl 2-sulfoacrylate are cited.

In cases where a carboxylic acid or its salt (i.e. —COOM group) is introduced, (metha)acrylic acid or maleic acid may be usable. In cases where phosphoric acid or its salt is introduced, (metha)acrylic acid-2-phosphoric acid eater may be usable.

As examples of the vinyl chloride type copolymer is cited a compound represented by the following formula:

$$\left[ -(CH_2-CH)_j- \quad -(CH_2-\underset{OCOR_2}{\overset{R_1}{C}})_k- \quad -(CH_2-\underset{X}{\overset{R_3}{C}})_l- \quad -(CH_2-\underset{Y}{\overset{R_4}{C}})_m- \quad -(Z)_n \right] \quad \text{Formula (1)}$$
$$\phantom{xxx}Cl$$

In the formula, R$_1$, R$_2$, R$_3$ and R$_4$ are each independently a hydrogen atom or an alkyl group having 1 to 4 carbon atoms (e.g., methyl, ethyl, propyl, butyl, etc.) and each of them may be the same as or different from each other in the repeating unit block, Y is a group having an hydrophilic polar group, i.e., —A—$X_0$; X is a substituent having an epoxy group such as

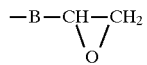

wherein A and B are a linkage group which has respectively an intramolecular base or epoxy group linked with the main chain of the copolymer, and the linkage group is as follows:

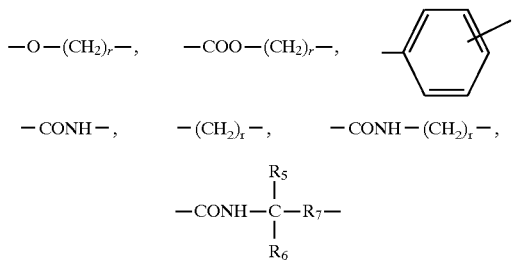

in the above, $R_5$ and $R_6$ are each a hydrogen atom, an alkyl group having 1 to 15 carbon atoms or a phenyl group; $R_7$ is an alkylene group having 1 to 15 carbon atoms, and r is an integer of 0 to 20; $X_0$ is a hydrophilic polar group; and Z represents a repeating unit, which is optionally introduced for the purpose of modifying characteristics of modified vinyl chloride type copolymer. In formula (1), k is 200 to 800, l is 1 to 100, m is 1 to 100 and n is 0 to 200.

Next, synthesis of the vinyl chloride type copolymer used in the screen and panel of the invention will be explained. A given amount of a reactive monomer with an unsaturated bond from which the repeating unit represented by formula (1) is derived, is introduced into a reaction vessel such as an autoclave and polymerization can be proceeded by the use of a conventional polymerization initiator including a radical polymerization initiator such as benzoyl peroxide (BPO), or, an anion polymerization initiator and cation polymerization initiator azobisisobutylonitrile (AIBN). Thereafter, the resulting polymer is dried and optionally further subjected to a treatment such as pulverization to obtain a final product mainly in the form of white powder.

In general, polyesters can be prepared through condensation reaction of an aliphatic or aromatic polybasic acid (or its derivative) with an aliphatic or aromatic polyol. The hydrophilic polar group maybe contained either in the acid component or alcohol component. Alternatively, it may be introduced through polymerization reaction. Preferably, the hydrophilic polar group is contained in the polymerizing monomer, in terms of unreacted components and introducing yield.

Further, the hydrophilic polar group can be introduced through polymerization reaction, i.e., by having a compound having a hydrophilic polar group reacted with OH groups at the terminal position or in the side chain of a polyurethane, polyester, polyvinyl chloride, polyvinyl butylal or nitrocellulose, of which chain length is previously extended to a given extent through polymerization. In this case, a compound having a OH group and hydrophilic polar group is initially synthesized. Then this compound is reacted with equimolar amount of a polyisocyanate compound such as a diisocyanate to obtain a reaction product of one NCO group of, e.g., diisocyanate and the above compound having a OH group. Further, through reacting unreacted NCO groups with OH groups present in the main chain or side-chain of the resin described above is obtained a resin into which the hydrophilic polar group has been introduce.

As commercially available products of these compounds are cited, for example, vinyl chloride-vinyl acetate copolymer containing —$SO_3K$ group, MR110 (produced by Nihon Zeon Co. Ltd.) and polyester containing —$SO_3Na$ group, Biron 280 (produced by Toyobo Co. Ltd.).

A resin not containing a hydrophilic polar group may be contained in the binder. Examples of the resin are one having a weight-averaged molecular weight of 5,000 to 200,000, including urethane-vinyl chloride copolymer, vinyl chloride-vinyl acetate copolymer, vinyl chloride-vinilidene chloride copolymer, vinyl chloride-acrylonitrile copolymer, butadiene-acrylonitrile copolymer, polyamide, polyvinyl butyral, cellulose derivative (e.g., nitrocellulose), styrene-butadiene copolymer, a variety of types of synthetic rubber resin, phenol resin, epoxy resin, urea resin, melamine resin, phenoxy resin, silicone resin, acryl resin and urea-formamide resin. Among these, polyurethane-polyester, vinyl chloride type copolymer, polyvinyl butyral and nitrocellulose are preferably used.

The content of the hydrophilic polar group is expressed in terms of mg/g of resin. In the cases when mixed in combination with other polymer resin(s), the content of the hydrophilic polar group is preferably 0.01 to 100 mg per g of the total binder (resin) containing the fluorescent substance. This range is most effective for dispersion stability.

The hydrophilic polar group can be identified by means of, e.g., NMR (Nuclear Magnetic Resonance) and quantitatively determined by wavelength-dispersion type fluorescent X-ray analysis (WDX). As an exemplary means of measuring the content of the hydrophilic polar group, the content of an $SO_3M$ group can be determined according to the following manner. Various amounts of sulfur (S) at a purity of 99.9999% are added to a matrix resin, with a given amount of a phosphorus (P)-containing compound as an internal standard material. Fluorescent X-ray intensities of S to P are measured with respect to each sample by the WDX to prepare a calibration curve for the content of sulfur. Next, to a sample is added a given amount of P-containing compound, which was subjected to WDX analysis to determine the P-content.

Examples of preferred fluorescent substance used in the radiographic intensifying screen of the invention include the following: tungstate fluorescent substance (e.g., $CaWO_4$, $MgWO_4$, $PbWO_4$ etc.); terbium activated rare earth sulfide fluorescent substance (e.g., $Y_2O_2S$:Tb, $Gd_2O_2S$:Tb, $La_2O_2S$:Tb, $(Y.Gd)_2O_2S$:Tb, $(Y.Gd)_2O_2S$:Tb. Tm, etc.); terbium activated rare earth phosphate fluorescent substance (e.g., $YPO_4$:Tb, $GdPO_4$:Tb, $LaPO_4$:Tb etc.); terbium activated rare earth oxyhalide fluorescent substance (e.g., LaOBr:Tb, LaOBr:Tb. Tm, LaOCl:Tb, LaOCl:Tb.Tm, LaOCl:Tb.Tm, LaOBr: Tb, GdOBr: Tb, GdOCl: Tb, etc.); thulium-activated rare earth oxyhalide fluorescent substance (e.g., LaOBr:Tm, LaOCl:Tm); barium sulfate fluorescent substance (e.g., $BaSO_4$:Pb, $BaSO_4$:$Eu^{2+}$, (Ba.Sr)$SO_4$:$Eu^{2+}$); bivalent europium activated alkali earth metal phosphate fluorescent substance [e.g., $(Ba_2PO_4)_2$:$Eu^{2+}$, $(Ba_2PO_4)_2$:$Eu^{2+}$, etc.); bivalent europium activated alkali earth metal fluorohalide fluorescent substance [e.g., BaFCl:$Eu^{2+}$, BaFBr:$Eu^{2+}$, BaFCl:$Eu^{2+}$.Tb, BaFBr:$Eu^{2+}$.Tb, $BaF_2BaClKCl$:$Eu^{2+}$, (Ba Mg)$F_2BaClKCl$:$E^{2+}$ etc.];iodide fluorescent substance (e.g., CsI:Na, CsI:Tl, NaI, KI:Tl); sulfide fluorescent substance [ZnS:Ag, (Zn Cd)S:Ag, (Zn Cd)S:Cu, (Zn Cd)S:Cu.Al]; hafnium phosphate fluorescent substance (e.g., $HfP_2O_7$:Cu); tantalate fluorescent substance (e.g., $YTaO_4$, $YTaO_4$:Tm; $YTaO_4$:Nb, [Y Sr]$TaO_{4-x}$:Nb, $LuTaO_4$, $LuTaO_4$:Nb, (Lu Sr)$TaO_{4-x}$:Nb, $GdTaO_4$:Tm, $Gd_2O_3TaO_4$:Tm, $Gd_2O_3Ta_2O_5B_2O_3$:Tb]. However, fluorescent substances usable in the invention are not to these compounds. Any fluorescent substance capable of emitting visible or near-ultra violet light upon exposure to radiation, may be usable.

Examples of the photo-stimulative fluorescent substance preferably used in the radiographic image converting panel according to the invention include the following: alkali earth metal halide fluorescent substance (e.g., BaFBr:Eu, BaFI:Eu, BaFBr$_{1-x}$I$_x$:Eu, BaFCl:Eu, BaFBr:Ce, BaBrI:Eu, BaBrClEu, SrFBr:Eu, BaBr$_2$:Eu etc.); alkali metal halide fluorescent substance (e.g., RbBr:Tl, RbI:Tl, CsI:Na, RbBr:Eu, RbI:Eu, CsI:Eu, etc.); sulfide fluorescent substance (e.g., SrS:Ce Sm, SrS:Eu Sm, CaS:Eu Sm, etc.); barium aluminate fluorescent substance (e.g., BaO.xAl$_2$O$_3$:Eu); alkali earth metal silicate fluorescent substance (e.g., MgO.xSiO$_2$, etc.), rare earth oxyhalide fluorescent substance (e.g., LaOBr:Bi Tb Pr); and phosphate fluorescent substance [e.g., $(3Ca_3(PO_4)_2CaF_2:Eu$, etc.). However, the photo-stimulated fluorescent substance used according to the invention is not limited to these compound. There may be usable any fluorescent substance which, after absorbing radiation energy, is capable of emitting the accumulated radiation energy in the form of fluorescence (photo-stimulated luminescence), through stimulating with visible light or infrared rays (stimulating light).

The average particle size of the fluorescent substance is preferably 0.5 to 20 μm. If the particle size is too small, it leads to enhanced light scattering and reduction in emission intensity. On the contrary, if the particle size is too large, it leads to deterioration of image sharpness and graininess. As to the content of the resin, the resin is contained in an amount of 0.5 to 20 parts by weight (preferably, 1 to 10 parts by weight) per 100 parts by weight of the fluorescent substance. When the content is too small, the fluorescent substance containing layer tends to become brittle. When the content is too large, the filling ratio of the fluorescent substance is lowered, resulting in an unaccepyable reduction of sensitivity.

As to a method for preparing the radiographic intensifying screen or radiographic image converting panel, first one is that a coating solution of the fluorescent substance comprised of a binder and the fluorescent substance (hereinafter referred to as a fluorescent substance coating solution or photo-stimulative fluorescent substance coating solution) is coated on a support to form a fluorescent substance layer.

A second one is that a sheet comprised of the binder and fluorescent substance is formed and then put onto the support, followed by a process of adhesion to the support at not lower than a softening or melting temperature of the binder.

As a method for forming the fluorescent substance layer on the support are cited the above two types of methods. However, any method whereby the fluorescent substance layer is uniformly formed on the support, may be adopted. Impingement coating may be usable.

In the first preparing method, the fluorescent substance layer is formed by coating a coating solution in which the fluorescent substance or photo-stimulative fluorescent substance is homogeneously dispersed in a binder, on the support and drying it.

In the second preparing method, on the other hand, the fluorescent substance sheet which is to form the fluorescent substance layer is prepared by temporarily coating a coating solution of the fluorescent substance or photo-stimulative fluorescent substance on a support or subbed support and drying, followed by peeling the layer off from the support. Thus, the binder and fluorescent substance particles are added in an appropriate solvent and mixed with stirring by means of a disperser or a ball mill to form a coating solution in which the fluorescent substance or photo-stimulative fluorescent substance is homogeneously dispersed in the binder.

Examples of the solvent for the coating solution include lower alcohols such as methanol, ethanol, n-propanol and n-butanol; chloro-containing hydrocarbons such as methylene chloride and ethylene chloride; ketones such as acetone, methyl ethyl ketone and methyl isobutyl ketone; cyclic hydrocarbon compounds such as toluene, benzene, cyclohexane, cyclohexanone and xylene; esters of a lower fatty acid and lower alcohol, such as methyl acetate, ethyl acetate and butyl acetate; and ethers such as dioxane, ethylene glycol monomethyl ester, ethylene glycol monoethyl ester.

The coating solution may contain a dispersing agent and plasticizer for the purpose of enhancement of dispersion of the fluorescent substance or binding power between the binder and fluorescent substance after forming the layer, respectively. Examples of the dispersing agent include phthalic acid, stearic acid, caproic acid and a hydrophobic surfactant. Examples of the plasticizer include phosphate esters such as triphenyl phosphate, tricresyl phosphate and diphenyl phosphate; phthalate esters such as diethyl phthalate and dimethoxyethyl phthalate; glycolate esters such as ethyl phthalylethyl glycolate and butyl phthalylbutyl glycolate; polyesters of polyethylene glycol and dibasic fatty acid, such as polyester of triethylene glycol and adipic acid and polyester of diethylene glycol and succinic acid.

The thus-prepared coating solution containing the fluorescent substance and binder is uniformly coated on the temporary support to form a coating layer of the coating solution. A means for coating is, for example, a doctor blade, roll coater, knife-coater, extrusion coater and so forth.

Support or temporary support made of glass, wool, cotton, paper or metal may be usable and those which are capable of being converted in the form of flexible sheet or roll are preferred in terms of handleability as information recording material. In view thereof are preferred plastic films such as cellulose acetate film, polyester film, polyethylene terephthalate film, polyamide film, polyimide film, triacetate film and polycarbonate film; metal sheets such as aluminum foil and aluminum alloy foil; and paper including paper for general use, paper for use in printing such as coated paper and art paper, photographic base paper such as baryta paper and resin-coated paper, paper sized with polysaccharide as described in Belgian Patent 784,615, pigment paper containing pigment such as titanium dioxide, and paper sized with poly(vinyl alcohol).

In the second preparing method, coat on a temporary support or subbed-support is peeled off from the support to form a fluorescent substance layer sheet. Therefore, it is preferred that the surface of the support is previously coated with a releasing agent so that the fluorescent substance layer is easily peelable.

To strengthen binding between the support and fluorescent substance layer, a sub layer may be provided by coating polyester or gelatin on the surface of the support to enhance adhesion. There may be provided a light-reflecting layer comprised of light-reflecting material such as titanium dioxide or a light-absorbing layer comprised of light-absorbing material such as carbon black, for the purpose of enhancement of sensitivity and image quality (e.g., sharpness, graininess, etc.).

The fluorescent substance layer according to the invention may be compressed. Compression of the fluorescent substance layer leads to an increase of a filling density of the fluorescent substance and improvements in sharpness and graininess. Compression can be made by the use of a pressing machine or calendering roll. In the case of the first preparing method, the fluorescent substance and support are compressed together as such. In the case of the second preparing method, the obtained fluorescent substance sheet is put on the support and compressed at not lower than a softening temperature or melting temperature of the binder to cause the fluorescent substance sheet to adhere to the support. Thus, the fluorescent substance sheet can be expanded to further thinner thickness by employing the method of compression-adhering, instead of previously fixing the sheet to the support.

Conventionally, the radiographic intensifying screen and the radiographic image converting panel each have a transparent protective layer provided on the surface of the fluorescent substance layer for physical and chemical protection thereof. In the invention, the transparent protective layer is preferably provided. The thickness thereof is in general within a range of 2 to 20 μm.

The transparent protective layer can be formed by coating, on the surface of the fluorescent substance layer, a solution prepared by dissolving in an appropriate solvent a cellulose derivative such as cellulose acetate or nitrocellulose, or a synthetic polymer material such as polymethyl methaacrylate, polyethylene terephthalate, poly(vinyl butyral), poly(vinyl formal), polycarbonate, poly(vinyl acetate), copoly(vinyl chloride.vinyl acetate). These polymer materials may be used singly or in combination thereof. In cases when coating the protective layer, a cross-linking agent may be added thereto immediately before coating.

The protective layer may be formed by adhering a sheet comprised of poly(ethylene terephthalate), poly(ethylene naphthalate), polyethylene, poly(vinilidene chloride) or polyamide with an adhesive.

The protective layer according to the invention is preferably formed with a coating layer containing an organic solvent-soluble fluoro resin. The fluoro resin is referred to as fluorine containing olefin (i.e., fluoroolefin) polymer or copolymer having as a copolymerizing component a fluorine containing olefin. The protective layer formed of fluoro resin coating may be cross-linked. The fluoro resin coating protective layer has such an advantage that stain due to fat resulted from touching with hands or photographic materials, or due to plasticizer bled out of the photographic material is not liable to penetrate into the internal portion of the protective layer, so that the stain can easily be wiped off. The fluoro resin may be used in combination with another polymer material for the purpose of improving layer strength.

The protective layer is preferably a transparent synthetic resin layer with a thickness of 10 μm or less and provided on the fluorescent substance layer. The use of such a thin protective layer, particularly in the case of the intensifying screen, shortens the distance from the fluorescent substance to a silver halide emulsion layer, contributing to improvement in sharpness of the resulting radiographic image.

EXAMPLES

Embodiments of the present invention are explained based on the following examples, but the invention is not limited to these examples.

Example 1

| Preparation of radiographic intensifying screen | |
|---|---|
| Coating solution of fluorescent substance layer | (parts by weight) |
| $Gd_2O_2S$:Tb (av. particle size 4 μm) | 100.0 |
| Binder (as shown in Tables 1 and 2) | 5.0 |

To the above composition with a binder having a functional group as shown in Tables 1 and 2, a mixed solvent of methyl ethyl ketone and toluene (in a ratio of 1:1) was added so as to have a viscosity of 20 Ps with stirring by a ball mill for 6 hrs. to obtain a coating solution of the fluorescent substance. Next, on a white polyethylene terephthalate support containing titanium dioxide horizontally set on a glass plate (thickness of 250 μm), the above coating solution by use of a knife-coater so as to have a coating amount of the fluorescent substance of 6 g/100 $cm^2$ was coated and dried to form a fluorescent substance layer. After forming the fluorescent substance layer, a polyester type adhesive was coated on one side of a polyethylene terephthalate film with thickness of 9 μm and the adhesive side thereof was brought into contact with the fluorescent substance layer side to provide a protective layer. Thus, radiographic intensifying screen samples of the invention, Nos. 2–11, 13–17, 19–23 and 25–42 and comparative samples, Nos. 1,12, 18 and 24 were prepared.

Evaluation of Radiographic Intensifying Screen
(a) Sharpness

Using the radiographic intensifying screen prepared as above and a X-ray photographic film SR-G (produced by Konica Corp.), a square wave chart of Funk test chart SMS-5853 (commercially available from Konica Medical Corp.) was photographed. Processing thereof was conducted at a developing temperature of 35° C. and fixing temperature of 33° C. for a total processing time of 45 sec., using an automatic processor SRX-502 (produced by Konica Corp.) and processing solution SR-DF (produced by Konica Corp.). A MTF value of each sample was measured based on the contrast method. The MTF value was represented in terms of a value at a spatial frequency of 2.0 cycles/mm. Thus, the MTF value is the more, the sharpness is the better.
(b) Graininess Using the radiographic intensifying screen sample and X-ray film (SR-G), exposure to X-ray at 80 kVp was made at a distance so as to give a density 1.0±0.1. Processing was conducted in the same manner as in above (a). Graininess was evaluated based on RMS granularity measured at an aperture of 48 μm The RMS granularity is described in T. H. James, "The Theory of the Photographic Process", pages 619–620 (1977, published by Macmillan). The smaller the RMS value is, the better graininess is.

Results thereof are shown in Tables 1 and 2.

TABLE 1

| Sample No. | Screen No. | Binder | | Sharpness (MTF) | Graininess (RMS) | Remarks |
| | | Resin | Polar group (mg/g) | | | |
|---|---|---|---|---|---|---|
| 1 | 1 | Polyurethane K | — 0 | 0.35 | 0.017 | Comp. |
| 2 | 2 | Polyurethane A | —$SO_3Na$ 2 | 0.41 | 0.012 | Inv. |

TABLE 1-continued

| Sample No. | Screen No. | Binder Resin | Polar group | (mg/g) | Sharpness (MTF) | Graininess (RMS) | Remarks |
|---|---|---|---|---|---|---|---|
| 3 | 3 | Polyurethane B | —SO₃Na | 10 | 0.44 | 0.011 | Inv. |
| 4 | 4 | Polyurethane C | —SO₃Na | 20 | 0.43 | 0.011 | Inv. |
| 5 | 5 | Polyurethane D | —SO₃Na | 40 | 0.42 | 0.012 | Inv. |
| 6 | 6 | Polyurethane E | —SO₃Na | 60 | 0.40 | 0.015 | Inv. |
| 7 | 7 | Polyurethane F | —SO₃Na | 120 | 0.38 | 0.016 | Inv. |
| 8 | 8 | Polyurethane G | —OSO₃Na | 10 | 0.41 | 0.012 | Inv. |
| 9 | 9 | Polyurethane H | —COOH | 10 | 0.40 | 0.014 | Inv. |
| 10 | 10 | Polyurethane I | —PO(OH)₂ | 10 | 0.40 | 0.013 | Inv. |
| 11 | 11 | Polyurethane J | —OPO(OH)₂ | 10 | 0.41 | 0.013 | Inv. |
| 12 | 12 | Polyester F | — | 0 | 0.33 | 0.018 | Comp. |
| 13 | 13 | Polyester A | —SO₃Na | 10 | 0.43 | 0.012 | Inv. |
| 14 | 14 | Polyester B | —OSO₃Na | 10 | 0.42 | 0.013 | Inv. |
| 15 | 15 | Polyester C | —COOH | 10 | 0.40 | 0.014 | Inv. |
| 16 | 16 | Polyester D | —PO(OH)₂ | 10 | 0.41 | 0.013 | Inv. |
| 17 | 17 | Polyester E | —OPO(OH)₂ | 10 | 0.41 | 0.014 | Inv. |
| 18 | 18 | Polyvinyl chloride F | — | 0 | 0.33 | 0.019 | Comp. |
| 19 | 19 | Polyvinyl chloride A | —SO₃Na | 10 | 0.43 | 0.012 | Inv. |
| 20 | 20 | Polyvinyl chloride B | —OSO₃Na | 10 | 0.42 | 0.013 | Inv. |
| 21 | 21 | Polyvinyl chloride C | —COOH | 10 | 0.40 | 0.015 | Inv. |
| 22 | 22 | Polyvinyl chloride D | —PO(OH)₂ | 10 | 0.41 | 0.014 | Inv. |
| 23 | 23 | Polyvinyl chloride E | —OPO(OH)₂ | 10 | 0.41 | 0.015 | Inv. |
| 24 | 24 | Polyvinyl butyral F | — | 0 | 0.32 | 0.017 | Comp. |
| 25 | 25 | Polyvinyl butyral A | —SO₃Na | 10 | 0.41 | 0.012 | Inv. |
| 26 | 26 | Polyvinyl butyral B | —OSO₃Na | 10 | 0.41 | 0.013 | Inv. |
| 27 | 27 | Polyvinyl butyral C | —COOH | 10 | 0.38 | 0.015 | Inv. |
| 28 | 28 | Polyvinyl butyral D | —PO(OH)₂ | 10 | 0.40 | 0.013 | Inv. |
| 29 | 29 | Polyvinyl butyral E | —OPO(OH)₂ | 10 | 0.38 | 0.013 | Inv. |

TABLE 2

| Sample No. | Screen No. | Binder Resin (A) | Binder Resin (B) | A/B | Polar group (mg/g) | Sharpness (MTF) | Graininess (RMS) | Remarks |
|---|---|---|---|---|---|---|---|---|
| 30 | 30 | Polyurethane B | Polyurethane K | 5/5 | 5 | 0.43 | 0.013 | Inv. |
| 31 | 31 | Polyurethane B | Polyurethane K | 1/9 | 0.1 | 0.42 | 0.013 | Inv. |
| 32 | 32 | Polyurethane B | Polyester F | 5/5 | 5 | 0.40 | 0.014 | Imv. |
| 33 | 33 | Polyurethane B | Polyvinyl chloride F | 5/5 | 5 | 0.42 | 0.014 | Inv. |
| 34 | 34 | Polyurethane B | Polyvinyl butyral F | 5/5 | 5 | 0.39 | 0.014 | Inv. |
| 35 | 35 | Polyester A | Polyurethane K | 5/5 | 5 | 0.41 | 0.014 | Inv. |
| 36 | 36 | Polyester A | Polyester F | 5/5 | 5 | 0.42 | 0.013 | Inv. |
| 37 | 37 | Polyester A | Polyvinyl chloride F | 5/5 | 5 | 0.39 | 0.014 | Inv. |
| 38 | 38 | Polyester A | Polyvinyl butyral F | 5/5 | 5 | 0.38 | 0.015 | Inv. |
| 39 | 39 | Polyvinil chloride A | Polyurethane K | 5/5 | 5 | 0.43 | 0.013 | Inv. |
| 40 | 40 | Polyvinil chloride A | Polyester F | 5/5 | 5 | 0.40 | 0.014 | Inv. |
| 41 | 41 | Polyvinil chloride A | Polyvinyl chloride F | 5/5 | 5 | 0.41 | 0.014 | Inv. |
| 42 | 42 | Polyvinil chloride A | Polyvinyl butyral F | 5/5 | 5 | 0.39 | 0.015 | Inv. |

As can be seen from Tables 1 and 2, radiographic intensifying screen samples Nos. 2 to 11, 13 to 17, 19 to 23 and 25 to 42, in which a binder containing a resin with a hydrophilic polar group according to the invention was used, were shown to be superior in sharpness and graininess, as compared to comparative samples Nos. 1, 12, 18 and 24.

Example 2

| Preparation of radiographic image converting panel | |
|---|---|
| Coating solution of photo-stimulative fluorescent substance layer | (parts by weight) |
| BaFBr:Eu (av. particle size 6 μm) | 200.0 |
| Binder (as shown in Tables 3 and 4) | 13.0 |

To the above composition with a binder as shown in Tables 3 and 4, a mixed solvent of methyl ethyl ketone and toluene (1:1) was added so as to reach a viscosity of 20 Ps with stirring by a ball mill for 6 hrs. to obtain a coating solution of photo-stimulative fluorescent substance. Next, on a white polyethylene terephthalate support containing titanium dioxide horizontally set on a glass plate (thickness of 250 μm), the above coating solution by use of a knife-coater so as to have a coating amount of the fluorescent substance of 6 g/100 cm² was coated and dried to form a photo-stimulative fluorescent substance layer. After forming the photo-stimulative fluorescent substance layer, a polyester type adhesive was coated on one side of a polyethylene terephthalate film with thickness of 9 μm and the adhesive side thereof was brought into contact with the photo-stimulative fluorescent substance layer side to provide a protective layer. Thus, radiographic image converting panels of the invention, Nos. 2–11, 13–17, 19–23 and 25–42 and comparative panels, Nos. 1,12, 18 and 24 were prepared.

Evaluation of Radiographic Image Converting Panel (a) Sharpness

A radiographic image converting panel attached with a CTF chart was exposed to X-ray at 80 kVp and 50 mA, at a distance from a bulb to the panel of 1.5 m and for a period of 0.1 sec. and then stimulated by scanning with semiconductor laser (wavelength:680 nm, beam diameter:100 μm φ). Photo-stimulated luminescence emitted from the photo-stimulative fluorescent substance was read and subjected to photoelectric conversion through a detector (photomultiplier tube) to obtain signals. A MTF value was obtained from the signals and based thereon, sharpness of the image was evaluated. The MTF value was represented in terms of a value at a spatial frequency of 2.0 cycles/mm.

(b) Graininess

A radiographic image converting panel was exposed to X-ray at 80 kVp and 50 mA, at a distance from a bulb to the panel of 1.5 m and for a period of 0.1 sec. and then stimulated by scanning with semiconductor laser (wavelength:680 nm, beam diameter:100 μm φ) Photo-stimulated luminescence emitted from the photo-stimulative fluorescent substance was read at a timing corresponding to a pitch of 25 μm and then subjected to photoelectric conversion through a detector (photomultiplier tube) to obtain signals. A RMS granularity value was determined from the signals and based thereon, graininess was evaluated. The RMS granularity described in T. H. James, "The Theory of the Photographic Process", pages 619–620 (1977, published by Macmillan) was applied to the radiographic image converting panel according to the invention. The smaller the RMS is, the better the graininess is.

Results thereof are shown in Tables 3 and 4.

TABLE 3

| Sample No. | Panel No. | Binder Resin | Polar group (mg/g) | Sharpness (MTF) | Graininess (RMS) | Remarks |
|---|---|---|---|---|---|---|
| 43 | 1 | Polyurethane K | — | 0 | 0.28 | 0.019 | Comp. |
| 44 | 2 | Polyurethane A | —SO$_3$Na | 2 | 0.33 | 0.013 | Inv. |
| 45 | 3 | Polyurethane B | —SO$_3$Na | 10 | 0.35 | 0.012 | Inv. |
| 46 | 4 | Polyurethane C | —SO$_3$Na | 20 | 0.35 | 0.011 | Inv. |
| 47 | 5 | Polyurethane D | —SO$_3$Na | 40 | 0.34 | 0.013 | Inv. |
| 48 | 6 | Polyurethane E | —SO$_3$Na | 60 | 0.31 | 0.017 | Inv. |
| 49 | 7 | Polyurethane F | —SO$_3$Na | 120 | 0.30 | 0.017 | Inv. |
| 50 | 8 | Polyurethane G | —OSO$_3$Na | 10 | 0.32 | 0.013 | Inv. |
| 51 | 9 | Polyurethane H | —COOH | 10 | 0.32 | 0.016 | Inv. |
| 52 | 10 | Polyurethane I | —PO(OH)$_2$ | 10 | 0.31 | 0.014 | Inv. |
| 53 | 11 | Polyurethane J | —OPO(OH)$_2$ | 10 | 0.32 | 0.013 | Inv. |
| 54 | 12 | Polyester F | — | 0 | 0.26 | 0.021 | Comp. |
| 55 | 13 | Polyester A | —SO$_3$Na | 10 | 0.35 | 0.013 | Inv. |
| 56 | 14 | Polyester B | —OSO$_3$Na | 10 | 0.34 | 0.014 | Inv. |
| 57 | 15 | Polyester C | —COOH | 10 | 0.32 | 0.016 | Inv. |
| 58 | 16 | Polyester D | —PO(OH)$_2$ | 10 | 0.32 | 0.014 | Inv. |
| 59 | 17 | Polyester E | —OPO(OH)$_2$ | 10 | 0.33 | 0.015 | Inv. |
| 60 | 18 | Polyvinyl chloride F | — | 0 | 0.26 | 0.022 | Comp. |
| 61 | 19 | Polyvinyl chloride A | —SO$_3$Na | 10 | 0.34 | 0.013 | Inv. |
| 62 | 20 | Polyvinil chloride B | —OSO$_3$Na | 10 | 0.33 | 0.014 | Inv. |
| 63 | 21 | Polyvinyl chloride C | —COOH | 10 | 0.32 | 0.017 | Inv. |
| 64 | 22 | Polyvinyl chloride D | —PO(OH)$_2$ | 10 | 0.33 | 0.016 | Inv. |

TABLE 3-continued

| Sample No. | Panel No. | Binder Resin | Polar group | (mg/g) | Sharpness (MTF) | Graininess (RMS) | Remarks |
|---|---|---|---|---|---|---|---|
| 65 | 23 | Polyvinyl chloride E | —OPO(OH)$_2$ | 10 | 0.32 | 0.018 | Inv. |
| 66 | 24 | Polyvinyl butyral F | — | 0 | 0.25 | 0.020 | Comp. |
| 67 | 25 | Polyvinyl butyral A | —SO$_3$Na | 10 | 0.41 | 0.012 | Inv. |
| 68 | 26 | Polyvinyl butyral B | —OSO$_3$Na | 10 | 0.41 | 0.013 | Inv. |
| 69 | 27 | Polyvinyl butyral C | —COOH | 10 | 0.38 | 0.015 | Inv. |
| 70 | 28 | Polyvinyl butyral D | —PO(OH)$_2$ | 10 | 0.40 | 0.013 | Inv. |
| 71 | 29 | Polyvinyl butyral E | —OPO(OH)$_2$ | 10 | 0.38 | 0.013 | Inv. |

TABLE 4

| Sample No. | Screen No. | Binder Resin (A) | Resin (B) | A/B | Polar group (mg/g) | Sharpness (MTF) | Graininess (RMS) | Remarks |
|---|---|---|---|---|---|---|---|---|
| 72 | 30 | Polyurethane B | Polyurethane K | 5/5 | 5 | 0.34 | 0.015 | Inv. |
| 73 | 31 | Polyurethane B | Polyurethane K | 1/9 | 0.1 | 0.34 | 0.015 | Inv. |
| 74 | 32 | Polyurethane B | Polyester F | 5/5 | 5 | 0.32 | 0.016 | Imv. |
| 75 | 33 | Polyurethane B | Polyvinyl chloride F | 5/5 | 5 | 0.33 | 0.015 | Inv. |
| 76 | 34 | Polyurethane B | Polyvinyl butyral F | 5/5 | 5 | 0.32 | 0.015 | Inv. |
| 77 | 35 | Polyester A | Polyurethane K | 5/5 | 5 | 0.33 | 0.016 | Inv. |
| 78 | 36 | Polyester A | Polyester F | 5/5 | 5 | 0.34 | 0.015 | Inv. |
| 79 | 37 | Polyester A | Polyvinyl chloride F | 5/5 | 5 | 0.31 | 0.016 | Inv. |
| 80 | 38 | Polyester A | Polyvinyl butyral F | 5/5 | 5 | 0.31 | 0.017 | Inv. |
| 81 | 39 | Polyvinil chloride A | Polyurethane K | 5/5 | 5 | 0.35 | 0.014 | Inv. |
| 82 | 40 | Polyvinil chloride A | Polyester F | 5/5 | 5 | 0.32 | 0.015 | Inv. |
| 83 | 41 | Polyvinil chloride A | Polyvinyl chloride F | 5/5 | 5 | 0.33 | 0.016 | Inv. |
| 84 | 42 | Polyvinil chloride A | Polyvinyl butyral F | 5/5 | 5 | 0.32 | 0.016 | Inv. |

As can be seen from Tables 3 and 4, radiographic image converting panel samples Nos. 2 to 11, 13 to 17, 19 to 23 and 25 to 42, in which a binder containing a resin with a hydrophilic polar group according to the invention was used, were shown to be superior in sharpness and graininess, as compared to comparative samples Nos. 1, 12, 18 and 24.

What is claimed is:

1. A radiographic intensifying screen comprising a support having thereon a fluorescent substance layer containing fluorescent substance particles dispersed in a binder, wherein said binder comprises a resin containing a hydrophilic polar group selected from the group consisting of —SO$_3$M, —OSO$_3$M, —COOM, —PO(OM)$_2$ and —OPO(OM)$_2$, in which M is a hydrogen atom or an alkali metal atom.

2. The radiographic intensifying screen of claim 1, wherein the content of said hydrophilic polar group is 0.01 to 100 mg per g of the binder.

3. The radiographic intensifying screen of claim 1, wherein said resin contains the hydrophilic polar group selected from the group consisting of —SO$_3$M, —OSO$_3$M, —COOM, —PO(OM)$_2$ and —OPO(OM)$_2$, in which M is a hydrogen atom, sodium or potassium.

4. The radiographic intensifying screen of claim 5, wherein the content of said hydrophilic polar group is 0.01 to 100 mg per g of the binder.

5. The radiographic intensifying screen of claim 1, wherein said resin containing the hydrophilic polar group is a resin selected from the group consisting of polyurethanes, polyesters, polyvinyl chlorides, polyvinyl butyrals and nitrocelluloses.

6. A radiographic image converting panel comprising a support having thereon a photo-stimulative fluorescent substance layer containing photo-stimulative fluorescent particles dispersed in a binder, wherein said binder comprises a resin containing a hydrophilic polar group selected from the group consisting of —SO$_3$M, —OSO$_3$M, —COOM, —PO(OM)$_2$ and —OPO(OM)$_2$, in which M is a hydrogen atom or an alkali metal atom.

7. The radiographic image converting panel claim 6, wherein the content of said hydrophilic polar group used in the fluorescent substance layer is 0.01 to 100 mg per g of the binder.

8. The radiographic image converting panel of claim 6, wherein said resin contains the hydrophilic polar group selected from the group consisting of —$SO_3M$, —$OSO_3M$, —COOM, —$PO(OM)_2$ and —$OPO(OM)_{21}$, in which M is a hydrogen atom, sodium or potassium.

9. The radiographic image converting panel of claim 6, wherein said resin containing the hydrophilic polar group is a resin selected from the group consisting of polyurethanes, polyesters, polyvinyl chlorides, polyvinyl butyrals and nitrocelluloses.

10. The radiographic image converting panel claim 9, wherein the content of said hydrophilic polar group used in the fluorescent substance layer is 0.01 to 100 mg per g of the binder.

* * * * *